US005566894A

United States Patent [19]
Karch

[11] Patent Number: 5,566,894
[45] Date of Patent: Oct. 22, 1996

[54] SLAB BREAKING APPARATUS AND METHOD OF USE

[75] Inventor: Earl G. Karch, Webster, N.Y.

[73] Assignee: Xerox Corporation, Stamford, Conn.

[21] Appl. No.: 522,909

[22] Filed: Sep. 1, 1995

[51] Int. Cl.$^6$ .............................. B02C 13/02; B02C 19/00
[52] U.S. Cl. ...................... 241/29; 241/159; 241/186.35; 241/DIG. 37
[58] Field of Search .............................. 241/29, 158, 159, 241/195, 197, 186.35, DIG. 37

[56] References Cited

U.S. PATENT DOCUMENTS

| | | | |
|---|---|---|---|
| 909,914 | 1/1909 | Langdon | 241/158 X |
| 4,340,076 | 7/1982 | Weitzen | 241/DIG. 37 X |
| 5,215,265 | 6/1993 | Lodovico | 241/99 |
| 5,279,465 | 1/1994 | Stroppiana | 241/29 |

FOREIGN PATENT DOCUMENTS

| | | | |
|---|---|---|---|
| 1742079 | 6/1992 | U.S.S.R. | 241/29 |
| 2238965 | 6/1991 | United Kingdom | 241/158 |

*Primary Examiner*—John M. Husar
*Attorney, Agent, or Firm*—John L. Haack

[57] ABSTRACT

A thermoplastic slab breaking apparatus comprising a housing with a slab receiving aperture and an exit aperture on the base of said housing; a conveyor for conveying a continuous hot melt thermoplastic slab from a hot zone to a cool zone within said housing; a first rotatable slab breaker member comprising a pinwheel or a rigid rod with a plurality of rigid tines projecting radially outward therefrom and positioned in close proximity to the end of the conveyor in the cool zone, wherein the rod axis resides approximately in a plane defined by the conveyed slab and perpendicular to a line defined by the conveyed slab; and an optional second breaker member comprising a rigid rod with a plurality of rigid tines projecting radially outward therefrom and positioned approximately axially parallel and beneath the first slab breaker member; wherein the conveyor continuously transports the slab to the rotating first slab breaker and forces the slab into contact with the rotating tines of the slab breaker whereby the slab fragments into pieces, and wherein the pieces thereafter gravitationally fall downward and contact the optional rotating second breaker member so that the pieces are further fragmented into smaller pieces prior to exiting the housing through the exit aperture.

20 Claims, 2 Drawing Sheets

5,566,894

SLAB BREAKING APPARATUS AND METHOD OF USE

BACKGROUND OF THE INVENTION

The present invention relates to an apparatus for continuously breaking up into smaller, more manageable fragments, a continuously formed and fed, thermoplastic slab or sheet material. The present invention also relates to a method of using the slab breaking apparatus "in-line" to rapidly and continuously brake down friable thermoplastic slab or sheet material into fragment pieces thereby preventing deposition, accumulation, or jamming of slab or large particulate material in the apparatus housing. The apparatus is particularly useful in thermoplastic processing industries where continuously formed, sheet materials or formulated slabs, arising from the intermediate product of, for example, a melt mixing device or extruder, are continuously broken into smaller more easily processed fragments or pieces.

Machines which employ related pinwheel or rotating rods having radially projecting tines are known in the art, however, these devices have been employed principally for the purpose of particulate separation in continuous processing equipment, for example, separating seeds from cotton, and agricultural produce, and not for the combined purposes of expediting material handling, jam elimination, and particle size reduction, as in the present invention.

A problem frequently encountered in the processing of thermoplastics, particularly melt mixed or extruded materials, which are initially formulated, for example, in melt mixing equipment and in a continuous slab form, is the jamming or accumulation of slab material, that is, non particulate or non flowable solid slab fragment material, during a slab fragmentation step or comminution of the slab monolith into smaller, more easily handled, fragments or pieces. The generation or accumulation of non-particulate material in slab breaker machines can result in, for example, fouling of the machine and can lead to decreased material throughput and processing rates, and changes in particle size distribution properties of the educing particulate stream. Excessive accumulation of non-particulate material may result in equipment failure or require terminating the process stream and operation because of other process complications, arising downstream, due to the particulate material being too large for subsequent size reduction or particulate treatment equipment, for the inherent hazard potential to man and machine, and for the purpose of subsequent removal of accumulated non flowable particulates, and which process termination is costly and counterproductive.

The present invention provides, in embodiments, solutions to the aforementioned problems including large particulate accumulations or material buildup within a slab breaker means and the accompanying negative productivity impacts. The prior art does not, it is believed, recognize, address or solve the aforementioned problems as in the present invention which employs a thermoplastic slab breaking apparatus with improved slab breaking efficiency and efficacy.

SUMMARY OF THE INVENTION

It is an object of the present invention to provide an apparatus for processing materials, such as thermoplastics.

It is an object of the present invention to provide a thermoplastic slab breaking apparatus for use in size reduction equipment, in particular, particulate processing and transport equipment, and more particularly, in slab-to-particulate conversion processing machines, and which slab breaking apparatus has improved comminution efficiency and efficacy.

It is another object of the present invention to provide a thermoplastic slab breaking apparatus that effectively prevents, for example, non flowable slab fragments from forming or accumulating within the slab breaker housing.

Another object of the present invention is to provide a method of preventing retardation of slab comminution equipment efficiency by avoiding the formation and accumulation of non flowable slab, fragments within the slab breaker housing or in post slab breaker process equipment.

These and other objects of the present invention are achieved by providing a thermoplastic slab breaking apparatus comprising a housing which is situated adjacent to a source of continuous feed, shear fracturable, monolithic slab material, such as a melt mixing apparatus, and an exit aperture on the base of the housing; a conveyor for conveying a continuous hot melt thermoplastic slab from a hot zone to a cool zone within the housing; a first rotatable slab breaker member comprising a pinwheel or a rigid rod with a plurality of rigid tines projecting radially outward therefrom and positioned in close proximity to the end of the conveyor in the cool zone, wherein the rod axis resides approximately in a plane defined by the conveyed slab and perpendicular to a line defined by the forward or process direction of the conveyed slab; and an optional second breaker member comprising a rigid rod with a plurality of rigid tines projecting radially outward therefrom and positioned approximately axially parallel and beneath the first slab breaker member; wherein the conveyor continuously transports the slab to the rotating first slab breaker and forces the slab into direct contact with the rotating tines of the slab breaker so that the slab fragments break into small pieces, and wherein the pieces thereafter gravitationally fall downward and contact the optional rotating second breaker member so that the pieces are further fragmented into even smaller pieces prior to exiting the housing through the exit aperture. In embodiments, the aforementioned source of continuous feed can be situated within the aforementioned housing.

In embodiments of the present invention there is provided a slab breaking apparatus comprising a housing for receiving a continuously feed and shear fracturable, monolithic slab material, and an exit aperture on the base of the housing; a conveyor means for conveying a continuous hot melt thermoplastic slab from a hot zone to a cool zone within the housing; a first rotatable breaker means for breaking the advancing slab into slab fragments or smaller pieces; and an optional second breaker means for further breaking slab fragments into even still smaller fragments.

In embodiments of the present invention there is provided a method of preventing accumulation or jamming of thermoplastic slab material, and also non free flowing fragments or large particulate material derived therefrom, within a slab breaker housing, the method comprising providing a thermoplastic slab breaker apparatus as described above and as illustrated herein; providing a continuous feed of a thermoplastic resin monolithic slab from a melt mixing apparatus to the breaker apparatus conveyor, and slab breaker member or members; and operating the conveyor and breaker member(s) at a rotational velocity differential which is sufficient to break substantially all the continuous feed slab material into fragmented primary pieces or optionally fragmented secondary smaller pieces, wherein the width and length dimension of the fragmented primary pieces is less than about 5 to about 10 square centimeters, and the width and length dimension of the fragmented secondary pieces is from about 0.50 to about 1.0 square centimeters.

DETAILED DESCRIPTION OF THE INVENTION

The present invention provides in embodiments, an apparatus and method for reducing or eliminating the deposition of non flowable and non-particulate material in a process stream associated with monolith slab size reduction and pulverization equipment that is used, for example, in fine particle sizing operations and processes such as in the production of electrophotographic toner.

Figure 1:
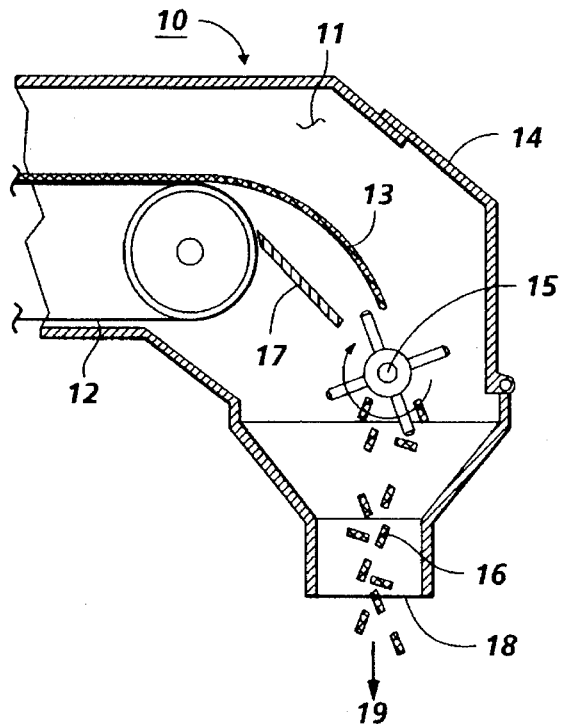
FIG. 1 is a sectioned view of a working slab breaker apparatus in the absence of the improved breaker configuration of the present invention.

Referring to FIG. 1, a conventional slab breaker apparatus 10 without the improved slab breaker member or members of the present invention is shown, with a housing 11, a conveyor means 12 for conveying a continuous hot melt thermoplastic slab 13 from a hot zone or region (not shown) to a cool zone approaching the end of the conveyor, for example, accorded by a convective gradient within the housing. The conveyed slab 13 contacts either the combination securable access/deflector panel 14, or the rotating (for example, counter-clockwise) slab breaker pinwheel member 15 thereby breaking the slab, for example, into large fragments 17 and into small fragments 16. Large fragments, such as represented by slab fragment 17 may also form without contacting the housing panel or the breaker 14 by breaking off of the conveyed slab monolith under the influence of its own unsupported weight. The presence of the aforementioned large 17 and small 16 fragments can lead to fouling, that is, material hold up or jamming of the slab breaker apparatus due to material retention, in a continuous materials processing line and result in the aforementioned problems and inefficiencies, for example, the rate or output of small particles 16 educing through aperture 18 to particle effluent 19 can be substantially impaired by large slab fragment or large particle jamming or material retention.

Figure 2:
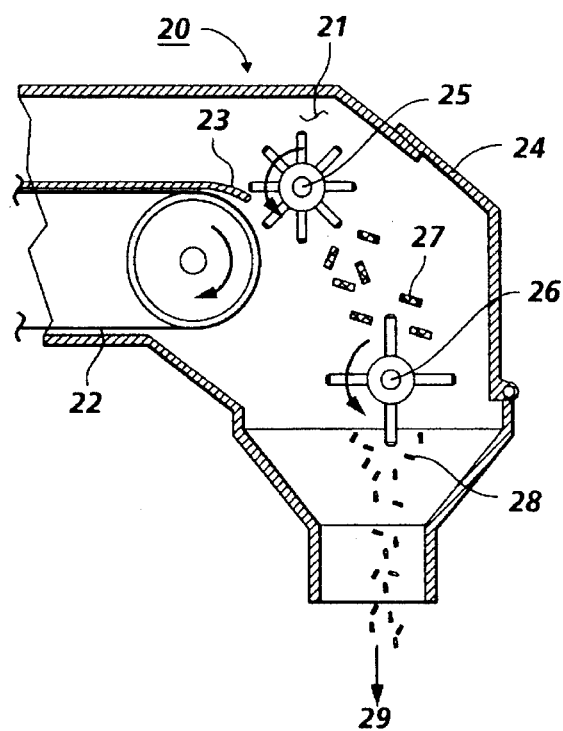
FIG. 2 illustrates, in embodiments, a sectioned view of an improved working slab breaker apparatus and configuration of the present invention.

FIG. 2 illustrates, in embodiments, an improved slab breaker apparatus 20 wherein the housing 21, slab conveyor 22 and conveyed slab 23, and access/deflector panel 24 are unchanged and as described in the aforementioned conventional slab breaker configuration of FIG. 1. The improved configuration introduces a slab breaker wheel member 25 which is in close proximity to the cool end or zone of the conveyed slab 23. The rotating breaker wheel 25, preferably rotating counterclockwise and the opposite direction of the conveyor as shown, results in an efficient immediate fracture or fragmentation of the continuously conveyed slab material and thereby avoids or substantially eliminates the formation of the aforementioned large slab fragment pieces previously identified as 17. Instead, small slab fragment particles 27 are the first formed product with the concomitant advantage that the aforementioned jamming and holdup of material is substantially eliminated. In embodiments, an optional second slab breaker wheel member 26, may be used to achieve greater levels of particle size reduction and increased material throughput. The second slab breaker wheel is preferably also rotating counter clockwise, that is, in the same relative direction as the first slab breaker wheel, and at a rotational velocity which is the same as or different from the rotational velocity of the first slab breaker wheel. In embodiments, the speed of the first breaker member is from about 180 to about 250 revolutions per minute (rpm), and speed of optional second breaker member is greater than or equal to the revolutions per minute of the first breaker member. Preferably, the speed of the second breaker is from about 300 to about 400 rpm, and more preferably, the speed of the second breaker is from about 310 to about 360 rpm. Thus, the second breaker is rotated at a relative speed in the range of about 1.2 to about 2 times the speed of the first breaker member. The sequential and respective action of slab breaker wheels 25 and 26 on the slab 23 and resulting small particles 27, respectively, provides substantially smaller particles 28 which produces an effluent particle stream 29 having substantially improved material throughput rates, reduced average particle size properties, and virtually holdup or jam free operation over extended periods of operation.

Although the improved performance and properties of the apparatus and particle size reducing method of the present invention were principal objects of the present invention, the extent to which the improvements were realized upon construction and demonstration of a working model were surprising and unexpected, for example, the extent of particle size reduction and the virtual elimination of throughput hold up and the elimination of large particles in the effluent particle stream, reference the working examples.

Figure 3:
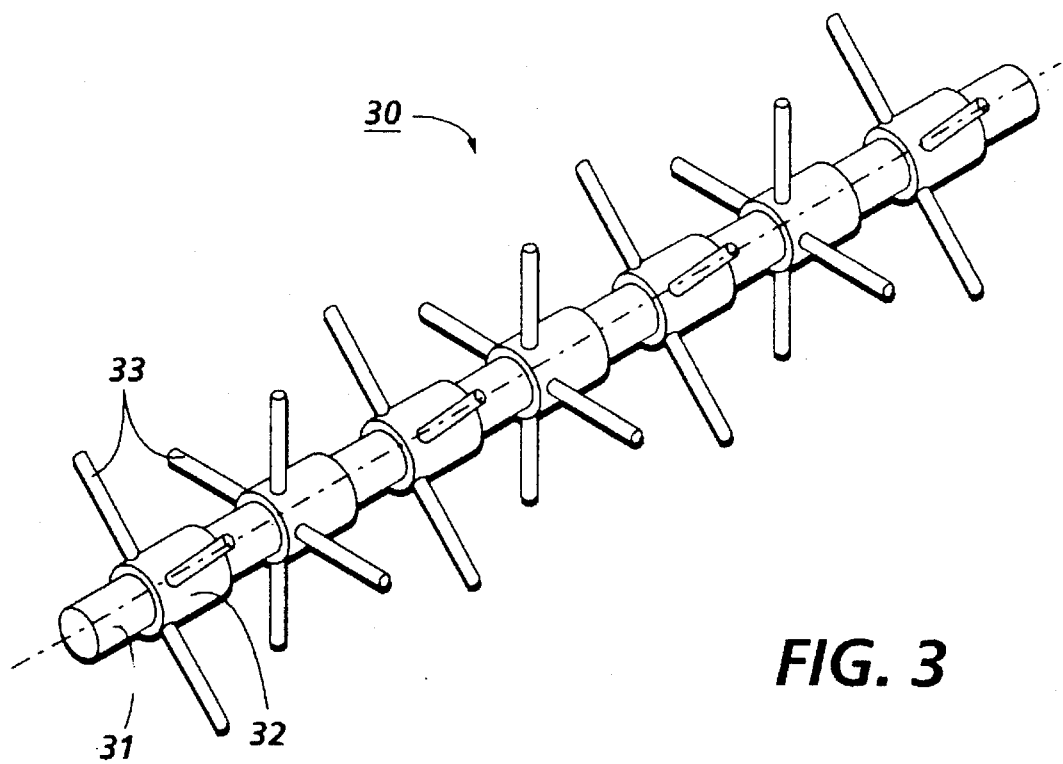
FIG. 3 illustrates, in embodiments of the present invention, a perspective view of an exemplary pinwheel or slab breaker wheel member wherein perpendicular tines in adjacent rows are approximately equidistantly staggered or interdigitated and spaced apart.
Figure 4:
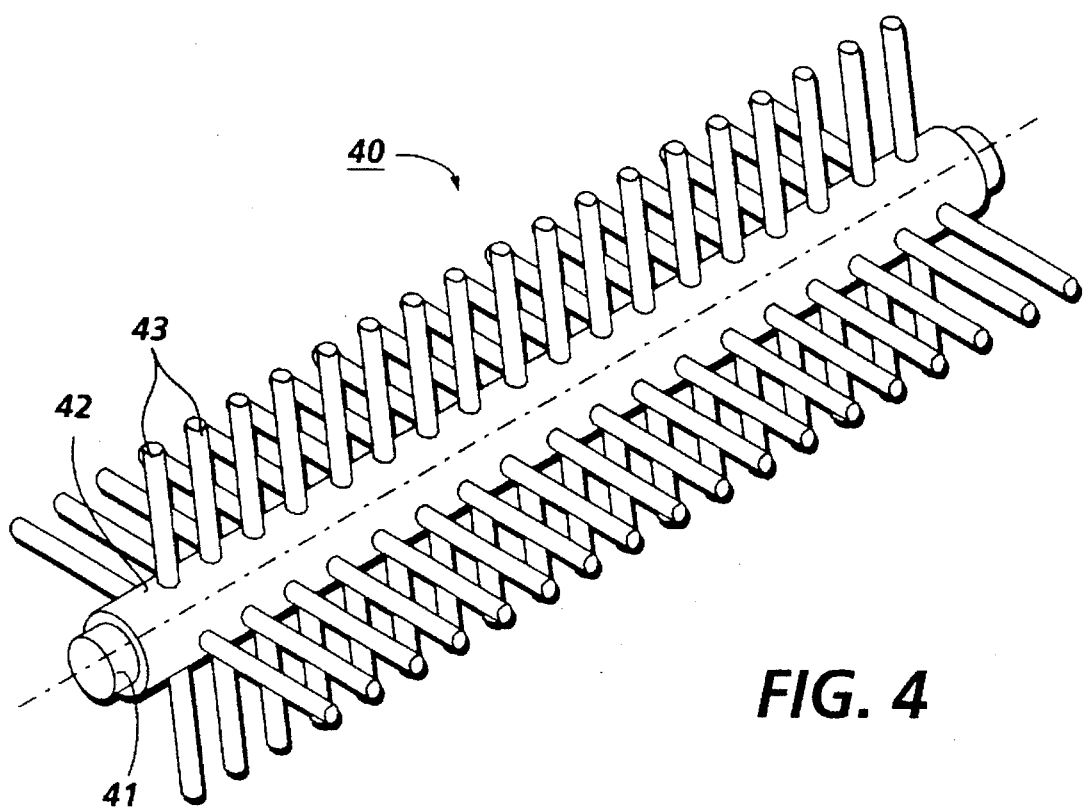
FIG. 4 illustrates, in embodiments of the present invention, a perspective view of an exemplary pinwheel or slab breaker wheel member wherein perpendicular tines in adjacent rows are aligned and slightly spaced apart.

The slab breaker pinwheels or bars of the present invention may be constructed from a variety of materials and in a variety of geometries and configurations so long as the objects of the present invention are achieved. FIGS. 3 and 4 illustrate, exemplary alternative geometrical embodiments, staggered and aligned, respectively, for the breaker wheels and radially projecting tines or prongs, which breaker members are believed to be responsible for breaking or shattering the slab and initially formed small particles into the aforementioned desired smaller particles 28. Thus, FIG. 3 illustrates an exemplary breaker member 30 including a rotatable shaft member 31 to which is attached a coupling shank 32 having tines or prongs 33 protruding outwardly therefrom. FIG. 4 illustrates breaker member 40 including components of rotatable shaft 41, attachable shank member 42, and tines or prongs 43. While the disposition and spacing of the tines is not believed to critical, experimental variation has shown that these tine parameters may be used in conjunction with other apparatus and process variables, such as the rotational velocity of the breaker wheels relative to the linear speed and delivery rate of the slab, thereby enabling high levels of control over the extent of the particle reduction and resulting product particle size properties. The width of the slab breakers are at least the width of the conveyed slab or the slab conveyor means, and preferably slightly larger than either; to prevent larger particles from spilling past the first slab breaker without being fractured. The rotational velocity of the breaker wheels and the slab conveyor can be provided by, for example, externally mounted motor means, which can be integrally configured using, for example, belts, pulleys or gears, to operate and cooperate from a single motor or drive means. In an embodiment, the drive means are separate entities for each breaker wheel member and for the slab conveyor. In another embodiment, the slab breaker members are rotated at a rate which is independent of and faster than the rate of the conveyor. The apparatus can optionally be equipped with sensor means which can monitor the slab breaker apparatus operation and process effluent particle properties and wherein the speed of conveyor and breaker wheel drive means can be automatically changed, for example, faster, slower or stopped, in accordance with predetermined or programmed particle product specifications and machine operational specifications. In a preferred embodiment, the rotational velocity differential between the slab conveyor and the slab breaker wheel members is controlled so that the revolutions per minute of the breaker members is always greater than the revolutions per minute of the conveyor.

The breaker wheels and tines provide the forces necessary to fracture the slab material to the appropriately sized particles and also provide means for regulating the particle material flow pattern and efficiency through the apparatus with different particulate material types, under different material flow conditions, and the like operational variations. In an exemplary slab breaker apparatus of the present invention, the slab breaker member or wheel can have from about 10 to about 100 tines, and preferably about 20 to 40 tines. In embodiments of the present invention, the tines of the slab breaker member can be substantially cylindrically shaped and from about 4.0 to about 5.0 centimeters in length, and from about 0.5 to about 0.6 centimeters in diameter. Other suitable tine or prong geometries may be selected. In an embodiment, the prongs or tines are made from a similar or different material as the supporting rod or shaft member and are integrally and rigidly fastened thereto by, for example, welding. The proximity of the slab breaker member relative to the slab end can vary depending or the material being processed and, for example, the brittleness or friability of the slab material, and in embodiments, can be from about 3.0 to about 4.0 centimeters from the end of the conveyor and at a distance which is slightly greater than the radius of the rotating slab breaker. The conveyor, in embodiments, conveys the slab at a rate of from about 250 to about 450 inches per minute.

The apparatus of the present invention can be fabricated in a variety of geometries providing that, for example, the aforementioned objectives are achieved. The apparatus housing may be fabricated with a wide range of walls thicknesses and length to width to depth, ratios. The apparatus housing can be fabricated from any suitable known enclosure material, for example, a durable and preferably rigid material, much as sheet metals, thermoset or high $T_g$ thermoplastic elastomer materials, and the like.

In accordance with another aspect of the invention, the apparatus and internal mechanical componentry may optionally have a wear resistant surface overcoating, and which coating provides enhanced wear properties and performance service life.

The rotatable slab breaker members are preferably rigid and not deformable by the action of the breaker members on the slab or resultant particulate material produced. The slab breaking apparatus and constituent components are constructed from materials which provide a high level of dimensional and environmental stability over extended periods of use, for example, in excess of 3 years of continuous use.

In accordance with still another aspect of the present invention, there is provided, as a result of the aforementioned method, improved: particle comminution rates and efficiencies, flow rates, and particle size distribution properties of the resulting particulate materials, and which improvements are substantially maintained at essentially constant levels as measured and compared to the a comparable apparatus which does not employ a slab breaker in close proximity to the cool end of the slab.

In embodiments, the aforementioned exit aperture 18 as implemented in the present invention can be truncated to funnel and facilitate collection and subsequent processing of the resulting fragmented slab pieces. In other embodiments, the conveyor can be, for example, a flexible endless belt or a rigid endless drum surface adapted for transporting and cooling to solidify the thermoplastic slab prior to contacting the first slab breaker member.

In another embodiment of the present invention, the slab breaker apparatus can have an optional deflector or guard plate (not shown) situated above the conveyor and slab which further directs and diverts the cooled slab directly into the rotating tines of the first rotating breaker member thereby further improving slab breaker fragmentation efficiency and efficacy. The addition of the aforementioned deflector plate may improve the extent of slab fragmentation achieved by the first breaker member and prevents large slab fragments from bypassing or avoiding slab breaker members and fragmentation. However, it is believed that in properly designed apparatus and method embodiments of the present invention, which should be readily evident to one of ordinary skill in the art, that the proximity and the counter rotational direction of the first slab breaker member relative to the slab conveyor direction as disclosed herein are important features for the success of the apparatus and method and may, when properly configured in accordance with the present invention, obviate the need for a deflector plate.

The present invention is useful in preventing the accumulation or deposition of particulate material in a variety of monolith to particulate process streams including, for example, particulate and powder materials such as pigments, metal oxide powders, waxes, antistatic compounds, charge control additives, resin and resin blends, and mixtures thereof. Other monolith to particulate process streams include any streams which embody a friable monolithic starting material or intermediate, and provide a particulate or powdered product or intermediate, such as chemicals, pharmaceuticals, foodstuffs, and the like.

The effective particle size range of particulate and powdered materials achievable with the apparatus and process of the present invention are from about 5 to about 10 square centimeters to about 0.50 to about 10 square centimeters.

The size of the apparatus may be any dimensions which effectively enables the transport and size reduction process of slab materials to be efficiently accomplished and as illustrated herein.

Typical thicknesses of slab or sheet feed materials, for example, thermoplastic resins, are from about 1 millimeter to about 20 centimeters.

The present invention provides a method and apparatus for simple and convenient slab and particle size reduction, and elimination of large particle formation in a slab-to-particle conversion process step, and wherein the accumulation or jamming of particulate material in the slab breaker apparatus and housing is substantially minimized or eliminated. The method of the present invention also provides for essentially constant levels, for example, for a period in excess of about 10,000 hours, of throughput rates, composition, and piece particle size distribution properties of the fragmented material collected from the housing. The aforementioned melt mixing apparatus contained within or used in conjunction with the slab breaker apparatus can be, for example, an extruder or Brabender mill.

In embodiments, the present invention is directed to a method or process for breaking or fragmenting thermoplastic monolithic slab materials into smaller more manageable pieces, the method comprising the steps of providing a thermoplastic slab breaker apparatus comprising a housing comprising or situated adjacent to a melt mixing apparatus, a slab receiving aperture, and an exit aperture on the base of said housing; a conveyor for conveying a continuous hot melt thermoplastic slab from a hot zone to a cool zone within said housing; a first rotatable slab breaker member comprising a pinwheel or a rigid rod with a plurality of rigid tines projecting radially outward therefrom and positioned in close proximity to the end of the conveyor in the cool zone, wherein the rod axis resides approximately in a plane defined by the conveyed slab and perpendicular to a line defined by the conveyed slab; and an optional second breaker member comprising a rigid rod with a plurality of rigid tines projecting radially outward therefrom and positioned approximately axially parallel and beneath the first slab breaker member; wherein the conveyor continuously transports the slab to the rotating first slab breaker and forces the slab into contact with the rotating tines of the slab breaker so that the slab fragments into pieces, and wherein the pieces thereafter gravitationally fall downward and contact the optional rotating second breaker member so that the pieces are further fragmented into still smaller pieces prior to exiting the housing through the exit aperture; providing a continuous feed of a thermoplastic resin monolithic slab from a melt mixing apparatus to the breaker apparatus conveyor, slab breaker and breaker members; and operating the conveyor and breaker members at a rotational velocity differential which is sufficient to break substantially all the continuous feed slab material into fragmented primary pieces or optionally fragmented secondary smaller pieces, wherein the length or width of the resulting fragmented pieces is less than about 1.0 to about 5.0 square centimeters and preferably less than about 0.5 to about 1.0 square centimeters.

The following Examples are being supplied to further define various species of the present invention, it being noted that these Examples are intended to illustrate and not limit the scope of the present invention. Parts and percentages are by weight unless otherwise indicated. A Comparative Example is also provided.

COMPARATIVE EXAMPLE I

A slab breaker apparatus substantially as shown in FIG. 1 was used in thermoplastic slab breaking operations with a material throughput of about 600 to about 800 lbs of material per hour. This apparatus optimally operated for about 4 to 6 hours, prior to failure due to jamming. In typical operation, the apparatus required shut down after only about 1 to 2 hours due to jamming and unacceptable material hold up. Apparatus remediation, including unjamming and equilibration re-heating of the associated extrusion feed processing equipment, typically resulted in about 4 hours of down time lost productivity, and lost material throughput in an amount of, for example, about 2,800 lbs of processed material. The extent of jamming appeared to be highly dependent on the type of thermoplastic slab material being processed. Thus, it was evident that jamming obstructions constrained the production process and resulted in undesirable reduced throughput and discontinuance of production for the purpose of removal of the jammed material.

EXAMPLE I

A slab breaker apparatus identical to that in COMPARATIVE EXAMPLE I was used with the exception that the apparatus was modified in accordance with aforementioned FIG. 2 to incorporate the aforementioned slab breaker member 25 as shown in either FIGS. 3 or 4 with the result that no jamming occurred over a period of at least about 1,800 hours of continuous operation which equates to in excess of about 1,200,000 lbs of continuously processed material, and with the result that no slab or large particle deposition or accumulation was observed within the breaker apparatus nor were there any particles greater than about 1.0 square centimeter in the resulting particle effluent. The particle effluent was continuously directed to, for example, a Fitzmill for further particle size reduction processing and which further size reduction processing was unencumbered and uninterrupted due to the absence of large slab fragments or large particles.

Other modifications of the present invention may occur to those skilled in the art based upon a review of the present application and these modifications, including equivalents thereof, are intended to be included within the scope of the present invention.

What is claimed is:

1. A thermoplastic slab breaking apparatus comprising:
   a housing with a slab receiving aperture, and a slab fragment exit aperture on the base of said housing;
   a conveyor for conveying a continuous hot melt thermoplastic slab from a hot zone to a cool zone at ambient temperature within said housing;
   a first rotatable slab breaker member comprising a pinwheel or a rigid rod with a plurality of rigid tines projecting radically outward therefrom and positioned in close proximity to the end of the conveyor in the cool zone, wherein the rod axis resides approximately in a plane defined by the conveyed slab and perpendicular to a line defined by the conveyed slab; and
   a second breaker member comprising a rigid rod with a plurality of rigid tines projecting radically outward therefrom and positioned approximately axially parallel and beneath the first slab breaker member;
   wherein the conveyor continuously transports the slab from the receiving aperture to the rotating first slab breaker and forces the slab into contact with the rotating tines of the slab breaker whereby the slab fragments into pieces, and wherein the pieces thereafter gravitationally fall downward and contact the rotating second breaker member so that the pieces are further fragmented into smaller pieces prior to exiting the housing through the exit aperture.

2. An apparatus of claim 1 wherein the fragmented pieces are from about 5 to about 10 centimeters in length and about 5 to about 10 centimeters in width.

3. An apparatus of claim 1 wherein the smaller fragmented pieces are from about 0.50 to about 1.0 centimeters in length and about 0.50 to about 1.0 centimeters in width.

4. An apparatus of claim 1 wherein the slab breaker member has from about 20 to about 40 tines.

5. An apparatus of claim 1 wherein the tines of the slab breaker members are equidistantly and symmetrically spaced apart about the circumference and the length of the rod.

6. An apparatus of claim 1 wherein the tines of the slab breaker members are in equidistantly and symmetrically spaced apart in rows about the circumference and the length of the rod and wherein adjacent rows of tines are in an alternately staggered relationship about the rod circumference.

7. An apparatus of claim 1 wherein the tines of the slab breaker member are substantially cylindrically shaped and are from about 4.0 to about 5.0 centimeters in length, and from about 0.5 to about 0.6 centimeters in diameter.

8. An apparatus of claim 1 wherein the proximity of the slab breaker member is from about 3.0 to about 4.0 centimeters from the end of the conveyor and at a distance greater than the rotating radius of slab breaker.

9. An apparatus of claim 1 wherein the slab breaker members are rotated at a rate which is independent of the rate of the conveyor.

10. An apparatus of claim 1 wherein the conveyor conveys the slab at a rate of from about 250 to about 450 inches per minute.

11. An apparatus of claim 1 wherein the exit aperture is truncated to funnel and facilitate collection and subsequent processing of the fragmented pieces.

12. An apparatus of claim 1 wherein the conveyor is a flexible endless belt or a rigid endless surface drum for transporting and cooling the thermoplastic slab prior to contacting the first slab breaker member.

13. An apparatus in accordance with claim 1 further comprising a deflector plate situated above the conveyor and slab which directs and diverts the cooled slab directly into the rotating tines of the first rotating breaker member thereby further improving slab breaker fragmentation efficiency and efficacy.

14. An apparatus in accordance with claim 1 wherein said housing and said hot zone are situated adjacent to and communicate with a melt mixing apparatus through the receiving aperture.

15. A method of preventing accumulation and jamming of thermoplastic slab material and particulate material derived therefrom, within a slab breaker housing, the method comprising:

providing a thermoplastic slab breaker apparatus comprising a housing with a slab receiving aperture, and a slab fragment exit aperture on the base of said housing;

a conveyor for conveying a continuous hot melt thermoplastic slab from a hot zone to a cool zone at ambient temperature within said housing;

a first rotatable slab breaker member comprising a pinwheel or a rigid rod with a plurality of rigid tines projecting radically outward therefrom and positioned in close proximity to the end of the conveyor in the cool zone, wherein the rod axis resides approximately in in a plane defined by the conveyed slab perpendicular to a line defined by the conveyed slab; and a second breaker member comprising a rigid rod with a plurality of rigid tines projecting radically outward therefrom and positioned approximately axially parallel and beneath the first slab breaker member;

wherein the conveyor continuously transports the slab from the receiving aperture to the rotating first slab breaker and forces the slab into contact with the rotating tines of the slab breaker whereby the slab fragments into pieces, and wherein the pieces thereafter gravitationally fall downward and contact the rotating second breaker member so that the pieces are further fragmented into smaller pieces prior to exiting the housing through the exit aperture;

providing a continuous feed of a thermoplastic resin monolithic slab from a melt mixing apparatus to the breaker apparatus receiving aperture, conveyor, slab breaker members; and operating the conveyor and breaker members at a rotational velocity differential which is sufficient to break substantially all the continuous feed slab material into fragmented primary pieces and fragmented secondary smaller pieces, wherein the largest dimension of the fragmented pieces is less than about 1.0 to about 5.0 square centimeters.

16. A method in accordance with claim 15 wherein the accumulation or jamming of particulate material in the slab breaker housing is substantially minimized or eliminated.

17. A method in accordance with claim 15 wherein the melt mixing apparatus is an extruder or rubber mill.

18. A method in accordance with claim 13 wherein the thermoplastic throughput rate, composition, and piece size distribution properties of the fragmented material collected from the housing, are maintained at substantially constant levels for a period in about 10,000 to about 20,000 hours.

19. A method in accordance with claim 15 wherein the rotational velocity differential is such that the revolutions per minute of the breaker members is greater than the revolutions per minute of the conveyor.

20. A method in accordance with claim 15 wherein the speed of the first breaker member is from about 180 to about 250 revolutions per minute, and the speed of the optional second breaker member is greater than or equal to the revolutions per minute of the first breaker member.

* * * * *